United States Patent [19]
Bae

[11] Patent Number: 5,809,289
[45] Date of Patent: Sep. 15, 1998

[54] CLOCK RECEIVER FOR NETWORK SYNCHRONIZATION CONTROL OF EXCHANGE SYSTEM

[75] Inventor: Tae-Kyung Bae, Daegukwangyeok, Rep. of Korea

[73] Assignee: SamSung Electronics Co., Ltd., Suwon, Rep. of Korea

[21] Appl. No.: 647,417

[22] Filed: May 9, 1996

[30] Foreign Application Priority Data

May 10, 1995 [KR] Rep. of Korea .................. 1995 11412

[51] Int. Cl.⁶ ........................................ G06F 1/04
[52] U.S. Cl. ......................... 395/553; 395/559; 375/356
[58] Field of Search ................................. 395/551, 553, 395/555, 559, 200.66, 200.67, 200.79; 375/354, 356, 357, 371, 376; 370/464, 498

[56] References Cited

U.S. PATENT DOCUMENTS

| | | | |
|---|---|---|---|
| 3,920,915 | 11/1975 | Schlichte | 179/15 BS |
| 4,740,961 | 4/1988 | Renner | 370/100 |
| 5,103,464 | 4/1992 | Capkun et al. | 375/106 |
| 5,259,005 | 11/1993 | LaRosa et al. | 375/106 |
| 5,331,667 | 7/1994 | Izumi | 375/107 |
| 5,481,574 | 1/1996 | Evert et al. | 375/356 |

*Primary Examiner*—Dennis M. Butler
*Attorney, Agent, or Firm*—Robert E. Bushnell, Esq.

[57] ABSTRACT

A clock receiving circuit provides network synchronization control of an exchange system. The clock receiving circuit includes a clock receiving unit for receiving a predetermined number of network synchronization reference clock signals exhibiting differential voltage levels from a trunk or a digital office time supply, and providing output of the network synchronization reference clock signals in corresponding logic levels. A clock determination unit determines whether the network synchronization reference clock signals received in the clock receiving unit are from a trunk or a digital office time supply.

20 Claims, 2 Drawing Sheets

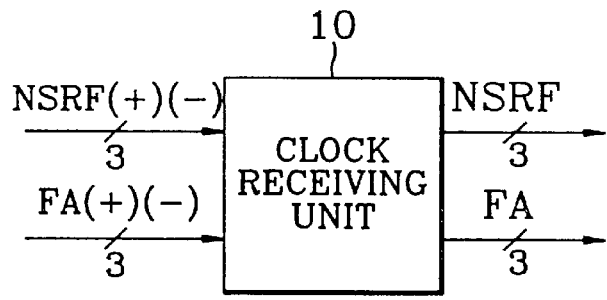
Fig. 1
Fig. 2
Fig. 3
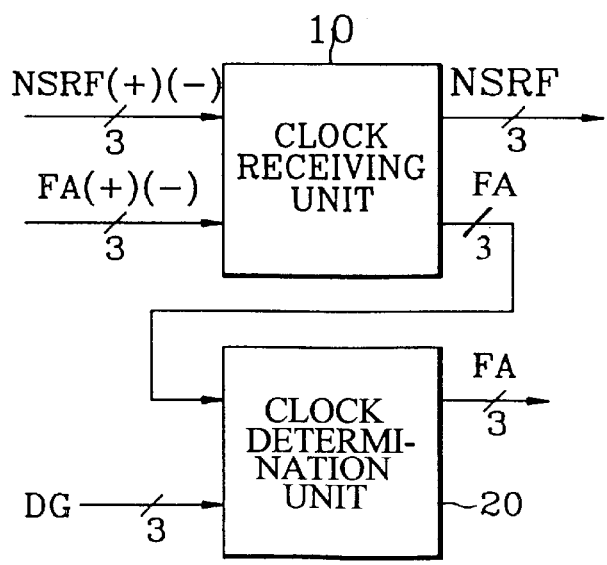
Fig. 4

CLOCK RECEIVER FOR NETWORK SYNCHRONIZATION CONTROL OF EXCHANGE SYSTEM

CROSS-REFERENCE TO RELATED APPLICATIONS

This application makes reference to, incorporates the same herein, and claims all benefits accruing under 35 U.S.C. §119 arising from an application for Clock Receiver For Synchronization Control Of Exchange System earlier filed in the Korean Industrial Property Office on 10 May 1995 and there duly assigned Serial No. 11412/1995.

BACKGROUND OF THE INVENTION

The present invention relates to network synchronization control for an exchange system, and more particularly, to a circuit for accommodating clock signals supplied from both a trunk and a digital office time supply.

A telephone exchange for accommodating a digital communication line typically employs a synchronization system to prevent data omissions due to differences in operating frequencies between a network and an exchange. One recent effort involving this subject matter is U.S. Pat. No. 5,331,667 entitled Telephone Exchange Apparatus With Communication Line Clocking issued to Izumi. In Izumi '667, a clock is extracted from a signal received from a network, and an exchange switch is operated in synchronism with the extracted clock. When there is a phase difference between a pre-switching clock and a post-switching clock when the extracted clocks are switched upon changing communication lines, the post-switching clock is delayed by the phase difference between the two clocks. While this type of conventional art is useful for increasing the flexibility of clock control, I note that it fails to provide network compatibility by determining whether clock signals are received from either a trunk or digital office time supply.

In order to operate an exchange system, clock signals provided from a trunk are required. A maximum of three line network synchronization reference clock signals and three frame alarm signals are typically received from a trunk. Clock signals supplied from a trunk, however, can not always ensure quality telephone service. For this reason, the use of the digital office time supply has been adopted in part. The format of a digital office time supply receiving cable, however, is different from the format of a trunk receiving cable. In particular, the digital office time supply receiving cable does not accommodate frame alarm signals, but rather accommodates a digital office time supply ground signal DG. Therefore, since the two cables have different formats, there exists a need to develop a method for matching digital office time supply.

SUMMARY OF THE INVENTION

Therefore, it is an object of the present invention to provide an improved network synchronization control.

It is another object to provide a clock receiving process and circuit for accommodating both trunk clock signals and digital office time supply clock signals.

It is another object to provide a clock receiving circuit for enabling compatibility between conventional networks.

It is still another object to provide a clock receiving process circuit for enabling network synchronization control of an exchange system.

To achieve these and other objects, the present invention provides a clock receiving process and circuit for network synchronization control of an exchange system. The clock receiving circuit includes a clock receiving unit for receiving a predetermined number of network synchronization reference clock signals exhibiting differential voltage levels from a trunk or a digital office time supply, and providing output of the network synchronization reference clock signals in corresponding logic levels. A clock determination unit determines whether the network synchronization reference clock signals received in the clock receiving unit are from the trunk or the digital office time supply.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 illustrates a block diagram of a general clock receiving circuit;

FIG. 2 illustrates the format of trunk receiving cable;

FIG. 3 illustrates the format of a digital office time supply receiving cable;

FIG. 4 illustrates a block diagram of a clock receiving circuit constructed according to the principles of the present invention.

DETAILED DESCRIPTION OF THE INVENTION

Figure 5:
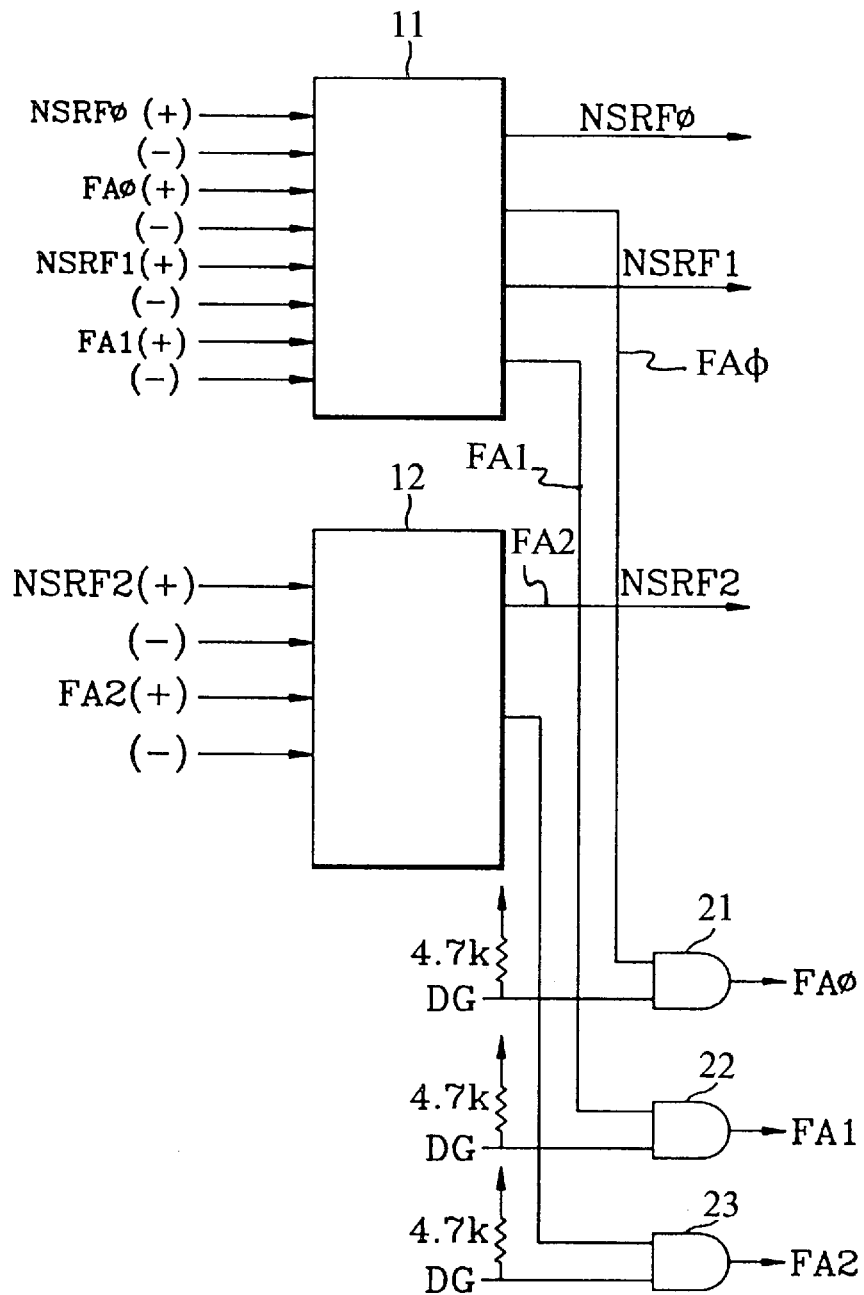
FIG. 5 illustrates a detailed circuit diagram of the clock receiving circuit shown in FIG. 4.

Turning now to the drawings and referring to FIG. 1, a block diagram of a general clock receiving circuit is shown. In FIG. 1, a clock receiving unit 10 receives up to three network reference clock signals and frame alarm signals in differential (i.e., +and −) voltage levels from a trunk, and provides output of the same in corresponding logic levels. These differential voltage levels are in accordance with the requirements of an RS-422 balanced electrical interface used pursuant to an international transmission protocol.

Referring to FIGS. 2 and 3, the formats of a trunk receiving cable and a digital office time supply receiving cable are shown, respectively. In FIGS. 2 and 3, the vertically listed numerals 1–3 and the horizontally listed letters A–C represent positions of the cable. As indicated by the drawings, the format of the digital office time supply receiving cable is different from the format of the trunk receiving cable. In particular, the digital office time supply receiving cable does not accommodate frame alarm signals, while the trunk receiving cable does. In other words, the digital office time supply does not utilize specific clock information, namely the frame alarm signals. The digital office time supply receiving cable, however, does accommodate a digital office time supply ground signal indicated as DG. Since the two cables have different formats, there exists a need to develop a method for matching digital office time supply.

Hereinafter, a preferred embodiment of the present invention will be described with reference to the attached drawings. In the following description, details of well-known functions or configurations that may obscure the present invention have been omitted.

Turning now to FIG. 4, a block diagram of a clock receiving circuit constructed according to the principles of the present invention is shown. In FIG. 4, a clock receiving unit 10 receives a maximum of three network reference clock signals in differential (i.e., + and −) voltage levels from a trunk or a digital office time supply, and outputs the network reference clock signals in corresponding logic levels to a network synchronization controller. Clock receiving unit 10 can also receive a maximum of three frame alarm signals in differential voltage levels from a trunk. A clock determination unit 20 determines whether the clock signals received by clock receiving circuit 10 are from a trunk or a digital office time supply by determining whether or not frame alarm signals are generated for output to the network synchronization controller.

Referring to FIG. 5, a detailed circuit diagram of the clock receiving circuit of FIG. 4 is shown. In FIG. 5, clock receiving unit 10 comprises first and second transistor—transistor logic converters 11 and 12, and clock determination unit 20 comprises first, second and third AND gates 21, 22 and 23.

First, the operation of the present invention in the case where network reference clock signals and frame alarm signals are received from a trunk will be described.

First transistor—transistor logic converter 11 receives NSRF0, NSRF1, FA0 and FA1 in differential voltage levels, and second transistor—transistor logic converter 12 receives NSRF2 and FA2 in differential voltage levels. First transistor—transistor logic converter 11 converts NSRF0, NSRF1, FA0 and FA1 into corresponding logic levels, and second transistor—transistor logic converter 12 converts NSRF2 and FA2 into corresponding logic levels. Referring to the trunk cable format shown in FIG. 2, terminal B1 is left open so that the frame alarm signals are generated independently of the digital office time supply ground signal, DG. That is, FA0 is output from first transistor—transistor logic converter 11 and is logically combined with a logic level high signal in AND gate 21, FA1 is output from first transistor—transistor logic converter 11 and is logically combined with a logic level high signal in AND gate 22, and FA2 is output from second transistor—transistor logic converter 12 and is logically combined with a logic level high signal in AND gate 23. Accordingly, the frame alarm signals are output from AND gates 21 through 23 in the same logic states they exhibited when output from first and second transistor—transistor logic converters 11 and 12.

Next, the operation of the present invention in the case where network reference clock signals are received from a digital office time supply will be described.

First transistor—transistor logic converter 11 receives NSRF0 and NSRF1 in differential voltage levels, and second transistor—transistor logic converter 12 receives NSRF2 in differential voltage levels. First transistor—transistor logic converter 11 converts NSRF0 and NSRF1 into corresponding logic levels, and second transistor—transistor logic converter 12 converts NSRF2 into a corresponding logic level. Referring to the digital office time supply cable format shown in FIG. 3, frame alarm signals are not provided from a digital office time supply, and the digital office time supply ground signal DG is present so that the outputs of AND gates 21 through 23 are always in a logic level low state. That is, FA0 is output from first transistor—transistor logic converter 11 and is logically combined with DG having a logic level low state in AND gate 21, FA1 is output from first transistor—transistor logic converter 11 and is logically combined with DG having a logic level low state in AND gate 22, and FA2 is output from second transistor—transistor logic converter 12 and is logically combined with DG having a logic level low state in AND gate 23.

Accordingly, AND gates 21 through 23 always output a logic level low signal when clock signals are received from a digital office time supply.

As described above, when receiving clock signals from a trunk, network reference clock signals and frame alarm signals having corresponding logic states are generated for transmission to a network synchronization controller. Alternatively, when receiving clock signals from a digital office time supply, network reference clock signals having corresponding logic states are generated for transmission to the network synchronization controller. Accordingly, the present invention accommodates clock signals received from both a trunk and a digital office time supply, thereby providing compatibility between conventional networks.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A clock receiving circuit for providing network synchronization control of an exchange system, said clock receiving circuit comprising:

a clock receiving unit for receiving a predetermined number of network synchronization reference clock signals exhibiting differential voltage levels from a trunk or a digital office time supply, and providing output of said network synchronization reference clock signals in corresponding logic levels; and a clock determination unit for determining whether said network synchronization reference clock signals received in said clock receiving unit are from said trunk or said digital office time supply.

2. The clock receiving circuit as claimed in claim 1, wherein said predetermined number is a maximum of three.

3. The clock receiving circuit as claimed in claim 1, wherein said clock receiving unit comprises:

a first transistor—transistor logic converter for converting first and second ones of said network synchronization reference clock signals into first and second logic signals, respectively; and a second transistor—transistor logic converter for converting a third one of said network synchronization reference clock signals into a third logic signal.

4. The clock receiving circuit as claimed in claim 3, further comprised of said first transistor—transistor logic converter for receiving first and second frame alarm signals from said trunk, and for converting said first and second frame alarm signals into fourth and fifth logic signals, respectively.

5. The clock receiving circuit as claimed in claim 4, further comprised of said second transistor—transistor logic converter for receiving a third frame alarm signal from said trunk, and converting said third frame alarm signal into a sixth logic signal.

6. The clock receiving circuit as claimed in claim 5, wherein said clock determination unit comprises:

a first AND gate connected to logical combine said fourth logic signal and a first predetermined logic signal;

a second AND gate connected to logical combine said fifth logic signal and a second predetermined logic signal; and a third AND gate connected to logical combine said sixth logic signal and a third predetermined logic signal.

7. The clock receiving circuit as claimed in claim 6, wherein an output provided from said first AND gate exhibits a same logic state as said fourth logic signal.

8. The clock receiving circuit as claimed in claim 6, wherein an output provided from said second AND gate exhibits a same logic state as said fifth logic signal.

9. The clock receiving circuit as claimed in claim 6, wherein an output provided from said third AND gate exhibits a same logic state as said sixth logic signal.

10. A clock receiving circuit for providing network synchronization control of an exchange system, said clock receiving circuit comprising:

clock receiving means for receiving a first predetermined number of network synchronization reference clock signals exhibiting differential voltage levels from a trunk or a digital office time supply, for receiving a second predetermined number of frame alarm signals exhibiting differential voltage levels from said trunk, and for providing output of said network synchronization reference clock signals and said frame alarm signals in corresponding logic levels; and clock determination means, connected to receive said frame alarm signals from said clock receiving means, for determining whether said network synchronization reference clock signals received in said clock receiving means are from said trunk or said digital office time supply.

11. The clock receiving circuit as claimed in claim 10, wherein said first predetermined number is a maximum of three.

12. The clock receiving circuit as claimed in claim 10, wherein said second predetermined number is a maximum of three.

13. The clock receiving circuit as claimed in claim 10, wherein said clock receiving unit comprises:

a first transistor—transistor logic converter for converting first and second ones of said network synchronization reference clock signals into first and second logic signals, respectively; and a second transistor—transistor logic converter for converting a third one of said network synchronization reference clock signals into a third logic signal.

14. The clock receiving circuit as claimed in claim 13, further comprised of said first transistor—transistor logic converter for converting first and second ones of said frame alarm signals into fourth and fifth logic signals, respectively.

15. The clock receiving circuit as claimed in claim 14, further comprised of said second transistor—transistor logic converter for converting a third one of said frame alarm signals into a sixth logic signal.

16. The clock receiving circuit as claimed in claim 15, wherein said clock determination unit comprises:

a first AND gate for logically combining said fourth logic signal and a first predetermined logic signal;

a second AND gate for logically combining said fifth logic signal and a second predetermined logic signal; and a third AND gate for logically combining said sixth logic signal and a third predetermined logic signal.

17. The clock receiving circuit as claimed in claim 16, wherein an output provided from said first AND gate exhibits a same logic state as said fourth logic signal.

18. The clock receiving circuit as claimed in claim 16, wherein an output provided from said second AND gate exhibits a same logic state as said fifth logic signal.

19. The clock receiving circuit as claimed in claim 16, wherein an output provided from said third AND gate exhibits a same logic state as said sixth logic signal.

20. A method for providing network synchronization control of an exchange system, comprising the steps of:

receiving a predetermined number of network synchronization reference clock signals exhibiting differential voltage levels from a trunk or a digital office time supply;

providing output of said network synchronization reference clock signals in corresponding logic levels; and determining whether said network synchronization reference clock signals received in said clock receiving unit are from said trunk or said digital office time supply based on whether frame alarm signals accompany said network synchronization clock signals.

\* \* \* \* \*